W. A. ELDER & W. P. PAGETT.
VALVE.
APPLICATION FILED JAN. 21, 1913.

1,125,675.

Patented Jan. 19, 1915.

Witnesses
J. L. Wright
L. Mueller

Inventors
W. A. Elder
W. P. Pagett
By Victor J. Evans,
Attorney

UNITED STATES PATENT OFFICE.

WILLIAM A. ELDER, OF OAKMONT, PENNSYLVANIA, AND WILLIAM P. PAGETT, OF FOWLER, INDIANA.

VALVE.

1,125,675. Specification of Letters Patent. Patented Jan. 19, 1915.

Application filed January 21, 1913. Serial No. 743,367.

*To all whom it may concern:*

Be it known that we, WILLIAM A. ELDER and WILLIAM P. PAGETT, citizens of the United States, residing at Oakmont and Fowler, respectively, in the counties of Allegheny and Benton, respectively, and States of Pennsylvania and Indiana, respectively, have invented new and useful Improvements in Valves, of which the following is a specification.

The general object of this invention is the provision of a combined check and cut off valve, the core thereof having mounted therein a check valve, said core being constructed in a novel manner whereby the same may be locked in a position so that the combined check and cut off valve may act either as a check valve or cut off, means being also provided whereby access may be readily had to the interior of the core for purposes of cleaning, replacing the check valve or grinding the seat therefor.

In carrying out the objects of the invention generally stated above, it will be understood, of course, that the essential features thereof are susceptible to changes in details and structural arrangements, one preferred and practical embodiment being shown in the accompanying drawing, wherein:—

Figure 1:
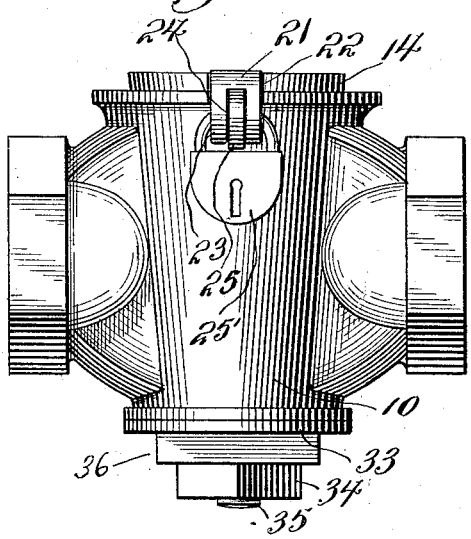
Figure 3:
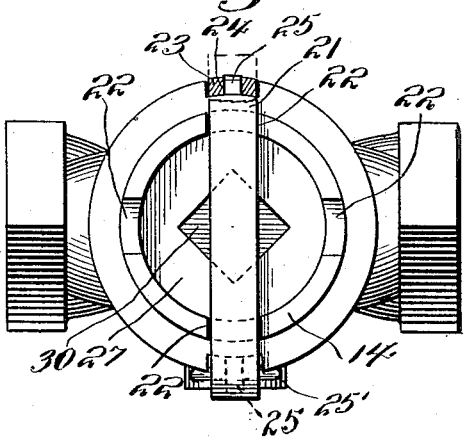
Figure 2:
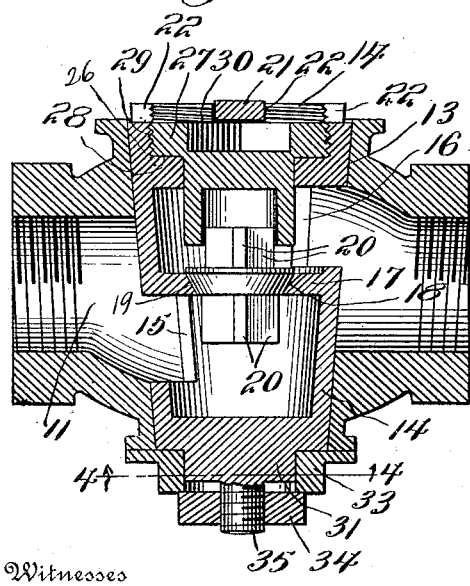
Figure 4:
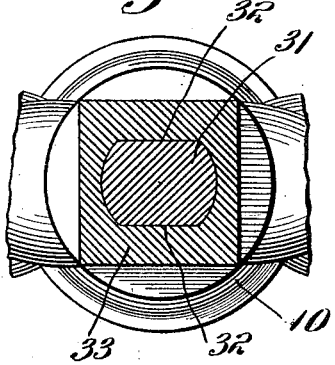
Figure 5:
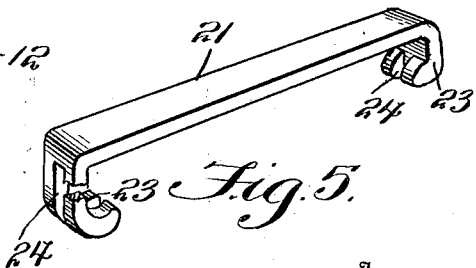

Figure 1 is a side elevation of the valve constructed in accordance with the invention. Fig. 2 is a vertical longitudinal sectional view of the valve when adapted to act as a check valve. Fig. 3 is a top plan view. Fig. 4 is a section on the line 4—4 of Fig. 2. Fig. 5 is a perspective view of a locking bar used in connection with the invention.

Referring more particularly to the accompanying drawing in which like reference characters designate similar parts, it will be seen that the invention comprises a main casing 10 having extending from diametrically opposite sides thereof the inlet and outlet ports 11 and 12 respectively. The casing 10 is provided with a central tapered opening 13 in which is mounted a tapered core 14, said core being adapted for rotary movement in the casing. The core 14 is provided at opposite sides thereof with the staggered inlet and outlet openings 15 and 16 respectively, said openings being separated from each other by means of a transverse partition 17 having a beveled opening 18 therein which is adapted to form a valve seat for the reception of the valve 19. The valve 19 has extending from both upper and lower surfaces thereof a plurality of wings 20 arranged substantially at right angles to each other. When the core is in the position illustrated in Fig. 2 it will be seen that the inlet port 11 of the casing communicates through the openings 15 and 16 of the core with the outlet port 12 of the casing. When pressure is admitted into the casing through the inlet port 11, said pressure will raise the valve 19 thus opening the communication between the inlet and outlet ports of the casing, but when there is not sufficient pressure to retain the valve in a raised position, the same will drop upon its seat 18 and thus prevent back pressure from the outlet port 12 passing into the inlet port 11.

The core 14 may be locked in the position shown in Fig. 2 by means of the locking bar 21 which is adapted to engage a plurality of oppositely disposed recesses 22 which are formed in the upper end of the core 14, said upper end extending slightly beyond the upper end of the casing 10. The locking bar 21 is provided at each end thereof with a lateral extension 23 having a bifurcation 24 therein which is adapted to engage the lugs 25 carried by the casing 10 whereby rotary movement of the core 14 is prevented. One of the lugs 25 is made larger than the other to receive the larger end of the locking bar and is provided with an opening adapted to receive a padlock 25′ for locking the core in position. The inner periphery of the core 14 is provided adjacent the upper end thereof with an annular shoulder 26 which is adapted to provide a seat for the plug 27, said plug having the annular flange 28 which is adapted to engage the said shoulder. The plug 27 may be retained in position by providing the same with external threads which are adapted to engage similar threads formed upon the inner periphery of the core 14 as indicated at 29. In order that the plug may be removed for the purpose of cleansing or repairing the check valve and its seat, said plug is provided upon its outer surfaces with a square recess 30 adapted to receive a tool for unscrewing the plug from engagement with the core. It is of course understood that before the plug 27 can be removed, the locking bar 21 must also be removed and in order to prevent the core from turning, should it be necessary to repair the valve while under pressure, the same core is provided with a locking device at the lower end thereof. This locking device comprises an extension 31 formed upon the lower end of the core 14, said extension having the straight sides 32. A lock nut 33 has an opening therein which is similar in shape to the extension 31 and adapted to engage the same when in position. The lock nut 33 is held in position by means of a nut 34 which is threaded upon the threaded projection 35 of the extension 31 thus retaining the lock nut 33 in position. Said lock nut is formed centrally thereof with an enlarged square portion 36 which is adapted to be engaged by a wrench whereby the core 14 is prevented from rotating when the plug 27 is being removed therefrom.

When it is desired to use the valve as a cut off, said core 14 may be given a quarter turn thus bringing the inlet and outlet openings 15 and 16 thereof into a non-alining position with respect to the inlet and outlet ports 11 and 12. When in this position the core may be prevented from rotating by means of the lock bar 21 in a manner previously described.

From the foregoing description taken in connection with the drawing, it will be seen that the invention contemplates providing a combined check and cut off valve which is simple in construction thus reducing the cost of manufacture of the same to a minimum and which is durable and effective in operation.

What is claimed is:—

1. A valve comprising a casing having inlet and outlet ports, a hollow core having an opening through its upper end and inlet and outlet openings therein rotatably mounted in said casing, a check valve mounted in said core and adapted to close communication between said inlet and outlet openings, a removable plug for closing the upper end of said core, the upper end of said core being provided with a plurality of oppositely disposed recesses, lugs carried by the upper end of said casing, a locking bar extending transversely across the upper end of said casing and engaging in oppositely disposed recesses in said core, said locking bar being provided at each end with bifurcated extensions engaging the said lugs, and means engaging the lower end of said core for preventing rotation thereof when said plug is being removed.

2. A valve comprising a casing having inlet and outlet ports, a hollow core having inlet and outlet openings rotatably mounted in said casing, a check valve for controlling communication between said openings, the core being formed in its upper end with an opening to permit passage of the check valve therethrough, a plug designed to seal said last mentioned opening, said plug having threaded connection with the core beyond the opening, and means normally engaging the casing and overlying and bearing upon the core and plug to lock the parts in applied positions.

In testimony whereof we affix our signatures in presence of two witnesses.

WILLIAM A. ELDER.
WILLIAM P. PAGETT.

Witnesses:
NELLIE MAUDE TAYLOR,
WILLIAM PENTLOWE TAYLOR.

Copies of this patent may be obtained for five cents each, by addressing the "Commissioner of Patents, Washington, D. C."